United States Patent [19]
Varila et al.

[11] Patent Number: 5,891,990
[45] Date of Patent: Apr. 6, 1999

[54] TREATMENT OF TALL OIL SOAP

[75] Inventors: Elias Varila, Jääli; Tellervo Rouvinen, Kemi, both of Finland

[73] Assignee: l'Air Liquide, Societe Anonyme pour l'Etude et Exploitation des Procedes Georges Claude, Paris, France

[21] Appl. No.: 702,493

[22] PCT Filed: Feb. 28, 1995

[86] PCT No.: PCT/FI95/00107

§ 371 Date: Nov. 29, 1996

§ 102(e) Date: Nov. 29, 1996

[87] PCT Pub. No.: WO95/23837

PCT Pub. Date: Sep. 8, 1995

[30] Foreign Application Priority Data

Mar. 1, 1994 [FI] Finland .................................. 940969

[51] Int. Cl.⁶ .............................. C09F 1/00; C07C 51/00
[52] U.S. Cl. ........................................... 530/208; 554/157
[58] Field of Search .............................. 530/208; 554/157

[56] References Cited

U.S. PATENT DOCUMENTS 3,901,869  8/1975  Bills ........................................ 260/97.5

FOREIGN PATENT DOCUMENTS 98166  12/1939  Sweden ...................................... 12/11

OTHER PUBLICATIONS

Chem. Abs. 120: 79894 (SU 1,766904A1) Jul. 10, 1992.

Raimo Alén, "Sulfaattikeitossa sivutuotteina syntyvien alifaattisten karboksyylihappojen hyödyntäminen", *Kemia–Kemi,* vol. 15, No. 6, pp. 565–569 (1988).

*Primary Examiner*—Paul J. Killos
*Attorney, Agent, or Firm*—Burns, Doane, Swecker & Mathis, L.L.P.

[57] ABSTRACT

The invention relates to a method for improving the separation of water in a tall oil preparation process which comprises:
  a neutralization stage in which a mixture of soap and water is neutralized with carbon dioxide,
  a water separation stage in which the aqueous phase containing bicarbonate is separated from the soap, and
  a cooking stage in which the soap obtained from the preceding stage is cooked with sulfuric acid to form tall oil, the improvement comprising the procedure that, after the neutralization with carbon dioxide but before the water separation stage, a second neutralization with sulfuric acid is carried out.

The invention also relates to a process comprising the stages presented above for the preparation of tall oil.

14 Claims, 1 Drawing Sheet

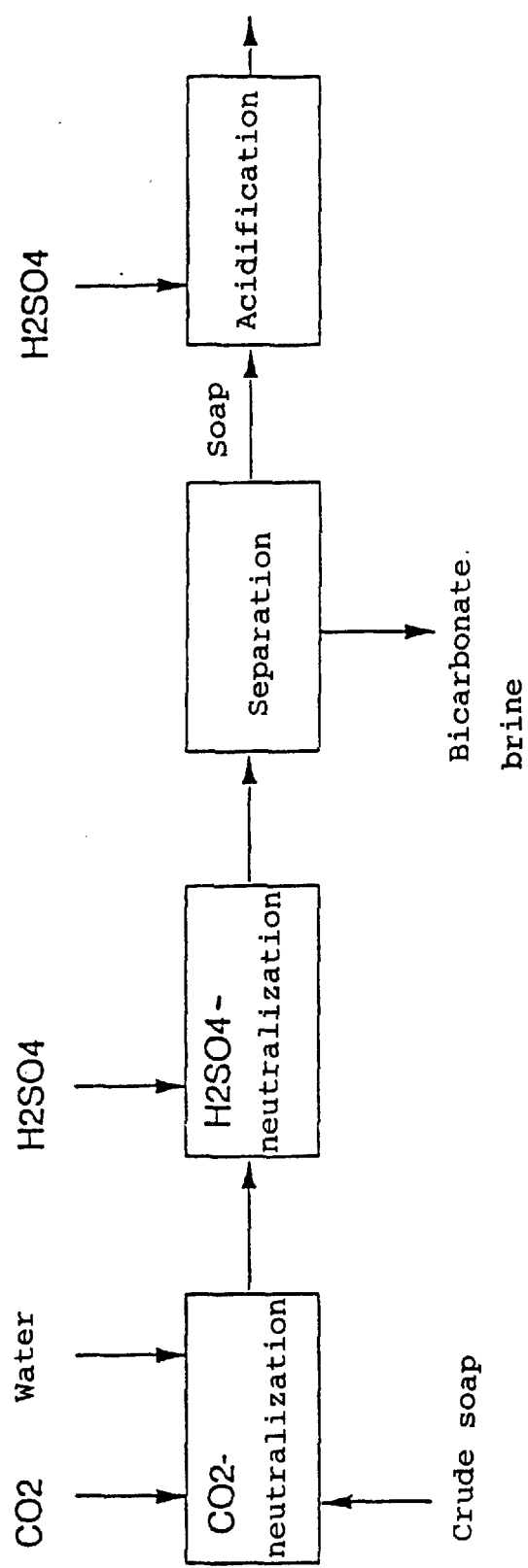
FIGURE

TREATMENT OF TALL OIL SOAP

The object of the present invention is a method for improving the separation of water in a tall oil preparation process comprising a neutralization stage in which a mixture of tall oil soap and water is neutralized with carbon dioxide, a water separation stage in which the aqueous phase containing bicarbonate is separated from the soap, and a cooking stage in which the soap obtained from the preceding stage is cooked with sulfuric acid to form tall oil. The invention also relates to a method for the preparation of tall oil, the method comprising the stages presented above.

In the alkaline digestion of softwood, especially in the sulfate process, so-called black liquor is formed which contains crude tall oil soap, hereinafter called crude soap. This crude soap can be decomposed with sulfuric acid to form crude tall oil.

A tall oil preparation process of the type stated at the beginning of the present specification, based on carbon dioxide neutralization, is known from U.S. Pat. No. 3,901,869. In the first stage of this known process, a neutralization with carbon dioxide is carried out. After this stage, water is separated, and finally a tall oil cook with sulfuric acid is performed.

When crude soap is treated with carbon dioxide, the carbon dioxide dissolves in the soap-water emulsion, and the formed carbonic acid neutralizes the soap and the lye accompanying it. The neutralization lowers the pH of the soap-water mixture to a range of 7.5–8.0.

In terms of the separation of the inorganic phase and the organic phase, the pH should be lowered 0.5–1.0 units, but without using an excess of carbon dioxide, which would result in effervescence. In terms of the economy of the process, a maximally high efficiency of the use of carbon dioxide is a key factor.

A problem in the state-of-the-art technology is thus poor separation of water. Poor separation of water results in that too much sulfuric acid is consumed in the further cook and the excess water unnecessarily expands the process cycles. The excess $CO_2$-containing water also causes effervescence in the cook with sulfuric acid, since bicarbonate decomposes during the cook.

An object of the invention is to improve the separation of the bicarbonate-containing aqueous phase in the water-separation stage after the neutralization with $CO_2$.

The principal characteristics of the invention are given in the accompanying claims.

The invention is based on the realization that, when a second neutralization with an addition of $H_2SO_4$ is carried out after the neutralization with $CO_2$, the separation of water in the water-separation stage is considerably improved. With an addition of $H_2SO_4$ the pH is lowered by approx. 0.5–1 pH units, to an optimum pH range of approx. 7.2–7.6. The adding of sulfuric acid is done according to the pH.

The sulfuric acid is added into an unpressurized reactor, which is located at a point after the carbon dioxide neutralization reactor or reactors, before the separation vessel.

The $CO_2$ neutralization can be carried out under normal pressure or under overpressure. The carbon dioxide used is preferably gaseous carbon dioxide.

DESCRIPTION OF THE DRAWING

The invention is described below in greater detail, with reference to the accompanying drawing, which is a block diagram of the tall oil preparation process according to the invention.

Crude soap and water are pumped into the $CO_2$ neutralization reactor, and gaseous $CO_2$ is introduced into it to neutralize the mixture. The mixture of soap and water is fed into the $H_2SO_4$ neutralization reactor, into which sulfuric acid is fed for further neutralization of the mixture of soap and water. Next, the soap is fed into the separation vessel, in which the bicarbonate brine is separated from the soap. Finally, the soap is fed into the tall oil cooker, in which acidification with sulfuric acid is performed, whereupon crude tall oil is obtained.

Example

The experiments were performed in a 2-liter autoclave. A batch was prepared which contained 500 g of soap and 800 g of water. The batch was mixed carefully, and thereafter it was transferred to the autoclave. The initial pH of the soap-water mixture was 12. The batch was heated to 50° C. When that temperature had been reached, there was directed to the autoclave a $CO_2$ flow by means of which the pressure prevailing in the autoclave was adjusted to 11 bar. After the autoclave stage (120 min), a sample of approx. 500 g was taken from the batch. The sample was divided into two aliquots, to one of which (experiment A according to the invention) some sulfuric acid was added to lower the pH (to 7.2) and to improve the separation of water. No sulfuric acid was added to the other (reference experiment B). Thereafter, water was separated from each mixture of soap and bicarbonate brine by pouring the mixture into a separation funnel.

The obtained aqueous phase was analyzed for the Na concentration (%) and the total $CO_2$ (%). By means of these, the concentration of $NaHCO_3$ (%) in the water was calculated.

Finally, a tall oil cook was performed using sulfuric acid. The obtained tall oil was analyzed for $H_2O$ and the resin acid percentage.

TABLE 1

Results of experiments A and B, of which B is a reference experiment and A an experiment according to the invention.

|  | B | A |
| --- | --- | --- |
| Separated aqueous phase (g) | 89 | 130 |
| Separated soap phase (g) | 163 | 120 |
| Aqueous phase: |  |  |
| Na (%) | 1.3 | 1.2 |
| CO2 (%) | 1.8 | 1.4 |
| NaHCO3 (%) | 1.53 | 0.95 |
| Tall oil: |  |  |
| H2O (%) | 6.1 | 5.5 |
| Resin acid (%) | 42.5 | 33.6 |

The results in Table 1 show that the sulfuric acid addition according to the invention improves the separation of water considerably. The additional acidification has removed water and, along with it, sodium bicarbonate, which can be seen from the results in Table 1. The same can be seen in the resin acid concentration in the tall oil obtained after the tall oil cook. The acidity is measured by titration, in which case bicarbonate remaining in tall oil increases the acidity, as seen from the results.

We claim:

1. A method for improving the separation of water in a tall oil preparation process which comprises the steps of:
    (i) neutralizing a mixture of soap and water with carbon dioxide,
    (ii) further neutralizing the soap and water mixture with sulfuric acid, (iii) separating an aqueous phase containing bicarbonate from the soap, and (iv) cooking the soap obtained from step (iii) with sulfuric acid to form tall oil.

2. A method according to claim 1, wherein the soap and water mixture has a pH value of 7.2–7.6 after the neutralization with sulfuric acid.

3. A method according to claim 1, wherein the neutralization with sulfuric acid decreases the pH value of the soap and water mixture by 0.5–1 pH units.

4. A method according to claim 1, wherein the neutralization with sulfuric acid is carried out under normal pressure.

5. A process for preparing tall oil, which comprises the steps of:

(i) neutralizing a mixture of soap and water with carbon dioxide, (ii) further neutralizing the soap and water mixture with sulfuric acid, (iii) separating an aqueous phase containing bicarbonate from the soap, and (iv) cooking the soap obtained from step (iii) with sulfuric acid to form tall oil.

6. A process according to claim 5, wherein the soap and water mixture has a pH value of 7.2–7.6 after the neutralization with sulfuric acid.

7. A process according to claim 5, wherein the neutralization with sulfuric acid decreases the pH value of the soap and water mixture by 0.5–1 pH units.

8. A process according to claim 5, wherein the neutralization with sulfuric acid is carried out under normal pressure.

9. A method according to claim 2, wherein the neutralization with sulfuric acid decreases the pH value of the soap and water mixture by 0.5–1 pH units.

10. A method according to claim 2, wherein the neutralization with sulfuric acid is carried out under normal pressure.

11. A method according to claim 3, wherein the neutralization with sulfuric acid is carried out under normal pressure.

12. A process according to claim 6, wherein the neutralization with sulfuric acid decreases the pH value of the soap and water mixture by 0.5–1 pH units.

13. A process according to claim 6, wherein the neutralization with sulfuric acid is carried out under normal pressure.

14. A process according to claim 7, wherein the neutralization with sulfuric acid is carried out under normal pressure.

* * * * *